United States Patent
Sheng et al.

(10) Patent No.: US 11,591,254 B2
(45) Date of Patent: Feb. 28, 2023

(54) ALUMINOSILICATE GLASS, CHEMICALLY STRENGTHENED GLASS, AND APPLICATION

(71) Applicant: HUAWEI TECHNOLOGIES CO., LTD., Guangdong (CN)

(72) Inventors: Qiuchun Sheng, Shanghai (CN); Yihong Huang, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 477 days.

(21) Appl. No.: 16/616,335

(22) PCT Filed: May 23, 2017

(86) PCT No.: PCT/CN2017/085567
§ 371 (c)(1),
(2) Date: Nov. 22, 2019

(87) PCT Pub. No.: WO2018/214033
PCT Pub. Date: Nov. 29, 2018

(65) Prior Publication Data
US 2020/0223740 A1    Jul. 16, 2020

(51) Int. Cl.
C03C 3/083    (2006.01)
C03C 21/00    (2006.01)
(Continued)

(52) U.S. Cl.
CPC .............. *C03C 3/083* (2013.01); *C03C 1/004* (2013.01); *C03C 3/112* (2013.01); *C03C 21/002* (2013.01);
(Continued)

(58) Field of Classification Search
CPC ......... C03C 3/083; C03C 1/004; C03C 3/112; C03C 21/002; G06F 3/041; G06F 2203/04103
See application file for complete search history.

(56) References Cited

U.S. PATENT DOCUMENTS 8,828,897 B2    9/2014    Fechner et al.
8,889,575 B2    11/2014    Boek et al.
(Continued)

FOREIGN PATENT DOCUMENTS

CN    102417301 A  *   4/2012
CN    102417301 A      4/2012
(Continued)

OTHER PUBLICATIONS

CN102417301A Machine Translation (Year: 2012).*
(Continued)

*Primary Examiner* — Karl E Group
*Assistant Examiner* — Cameron K Miller

(57) ABSTRACT

Aluminosilicate glass, chemically strengthened glass, and an application are provided. After the aluminosilicate glass is chemically strengthened, a glass substrate featuring a good mechanical strength and high chemical stability can be obtained, thereby meeting a requirement of cover glass for a glass material. The aluminosilicate glass does not include a B element and a P element, and includes at least silicon oxide, aluminium oxide, alkali metal oxide, and gallium
(Continued)

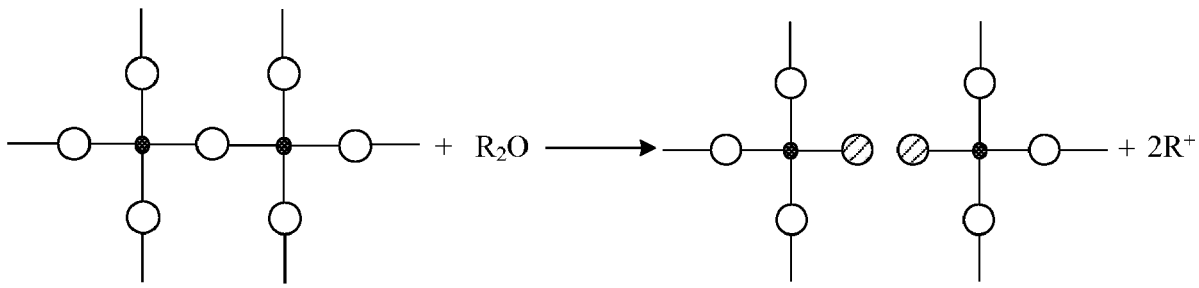

- Silicon ion
- ◯ Bridging oxygen ion
- ⊘ Non-bridging oxygen ion oxide. The alkali metal oxide is at least one of lithium oxide and sodium oxide. The glass is used for production of the cover glass.

19 Claims, 1 Drawing Sheet

(51) Int. Cl.
  *C03C 3/112* (2006.01)
  *C03C 1/00* (2006.01)
  *G06F 3/041* (2006.01)
(52) U.S. Cl.
  CPC .... *G06F 3/041* (2013.01); *G06F 2203/04103* (2013.01)

(56) References Cited

U.S. PATENT DOCUMENTS

| | | |
|---|---|---|
| 2012/0308827 A1 | 12/2012 | Boek et al. |
| 2013/0059716 A1 | 3/2013 | Fechner et al. |
| 2013/0295366 A1 | 11/2013 | Murata et al. |
| 2014/0011035 A1 | 1/2014 | Senshu et al. |

FOREIGN PATENT DOCUMENTS

| | | |
|---|---|---|
| CN | 102548919 A | 7/2012 |
| CN | 102584011 A | 7/2012 |
| JP | 2012148908 A | 8/2012 |
| WO | 2012/166421 A2 | 12/2012 |

OTHER PUBLICATIONS

XP024059450 Paige L. Higby et al., "Crystallization of Lithium Alumino/Galliosilicate Glasses", North-Holland, Amsterdam Journal of Non-Crystalline Solids, vol. 102, Issues 1-3 (Jun. 1, 1988), pp. 125-129.
Notice of Reasons for Rejection issued in Japanese Application No. 2019-565027 and English Translation thereof, dated Jan. 4, 2021.
International Search Report for PCT/CN2017/085567 dated Feb. 8, 2018, 4 pages.
Yingliang Tian et al., "New Glass Processing Technology", China Light Industry Press, dated Jun. 2009, total 10 pages.
Leibo Zhu, "Deep Processing of Flat Glass", dated 2002, Wuhan University of Technology Press, total 21 pages.

* cited by examiner

- ● Silicon ion
- ○ Bridging oxygen ion
- ⊘ Non-bridging oxygen ion

ALUMINOSILICATE GLASS, CHEMICALLY STRENGTHENED GLASS, AND APPLICATION

CROSS REFERENCE TO RELATED APPLICATIONS

This application claims priority to (and is a National Stage of) International Application No. PCT/CN2017/085567, filed on May 23, 2017, the entire contents of which are hereby incorporated by reference.

TECHNICAL FIELD

This application relates to the field of display screen technologies, and in particular, to aluminosilicate glass, chemically strengthened glass, and an application.

BACKGROUND

In recent years, with development of a mobile device, a shipment rate of cover glass is becoming higher. Especially, with development of modern display and touchscreen technologies, advanced intelligent products, such as a mobile phone, a liquid crystal display television, a liquid crystal display, a cash machine, and a print advertisement media machine, with flat-panel displays emerge in endlessly. Many functions and transactions are completed by touching a display screen by using a finger or a pen. This imposes a higher requirement on touchscreen cover glass. To be specific, the touchscreen cover glass is required to feature a high mechanical strength, a high Young's modulus, a low density, low costs, excellent bubble quality, and the like.

Cover glass manufacturers are constantly improving cover glass performance by improving glass composition. Some manufacturers add a boron (B) element or a phosphorus (P) element to aluminosilicate glass to meet a performance requirement of the cover glass. However, because the boron element and the phosphorus element are relatively active, when they are applied to the cover glass, chemical stability is poor, there is still a problem such as a low mechanical strength, and it is difficult to meet a requirement of the cover glass for a glass material.

SUMMARY

This application provides aluminosilicate glass. After the aluminosilicate glass is chemically strengthened, a glass substrate featuring a good mechanical strength and high chemical stability can be obtained, thereby meeting a requirement of cover glass for a glass material.

To achieve the foregoing objective, the following technical solutions are used in this application.

According to a first aspect, this application provides aluminosilicate glass, where the aluminosilicate glass does not include a B element and a P element, and includes at least silicon oxide, aluminium oxide, alkali metal oxide, and gallium oxide, and the alkali metal oxide is at least one of lithium oxide and sodium oxide. The silicon oxide and the aluminium oxide jointly form a main body of an aluminosilicate glass network structure, so that a glass substrate can be more stable and is not easily corroded by the outside, and hardness and a mechanical strength of the glass are ensured. The alkali metal oxide helps reduce a glass melting temperature, viscosity, and energy required for glass melting. Reducing the viscosity can help eliminate a bubble and can shorten a glass melting and fining time. Further, when the aluminosilicate glass is used to produce cover glass, the alkali metal oxide on a glass surface layer can be exchanged with an alkali metal ion (for example, a potassium ion) with a relatively large atomic radius at a high temperature, and is suitable for chemical strengthening. With the added gallium oxide, the aluminosilicate glass does not include the boron element and the phosphorus element. When a quantity of intermediate ions (for example, $Al^{3+}$ or $Ga^{3+}$) is less than that of modification ions (for example, $Li^+$), a role of an intermediate ion in the glass is a glass forming body ion, that is, four-coordinated $[AlO_4]$ or $[GaO_4]$ is formed. Therefore, a lithium ion with non-bridging oxygen bond(s) originally used for charge balance is used for charge balance of $[AlO_4]$ or $[GaO_4]$. The non-bridging oxygen bond in the glass is converted into a bridging oxygen bond. Addition of $[GaO_4]$ enhances the aluminosilicate glass network structure. Compared with glass including a three-coordinated boron element and phosphorus element, a network size of the mentioned aluminosilicate glass network structure is larger, a rigid structure of the mentioned aluminosilicate glass network structure is improved, and chemical stability of the mentioned aluminosilicate glass network structure is higher. In addition, a property, such as the mechanical strength and a glass transition temperature, of the glass are improved. In conclusion, the aluminosilicate glass provided in this application is suitable for the chemical strengthening, and after the chemical strengthening, a glass substrate featuring a good mechanical strength and high chemical stability can be obtained, thereby meeting a requirement of the cover glass for a glass material.

In a first possible implementation of the first aspect, a mass percentage of the gallium oxide is greater than 0 and less than or equal to 5%. By controlling the mass percentage of the gallium oxide to be within the foregoing range, cover glass featuring excellent chemical resistance, a low density, a proper expansion coefficient, and a high Young's modulus can be obtained.

In a second possible implementation of the first aspect, a mass percentage of the silicon oxide ranges from 45% to 75%, and a mass percentage of the aluminium oxide ranges from 13% to 25%. The silicon oxide is beneficial to mechanical performance and chemical stability of the glass. The aluminium oxide helps increase a strain point and a bending strength of the glass. Mass percentages of the silicon oxide and the aluminium oxide are controlled to be within the foregoing range, helping improve stability, weather resistance, meltability, and formability of the glass.

In a third possible implementation of the first aspect, a mass percentage of the alkali metal oxide ranges from 3% to 25%. Controlling the mass percentage of the alkali metal oxide to be within the foregoing range can effectively reduce the glass melting temperature, the viscosity, and the energy required for glass melting. Reducing the viscosity helps eliminate the bubble and shorten the glass melting and fining time. In addition, ion exchange between an alkali metal ion in the alkali metal oxide and the alkali metal ion with a relatively large atomic radius can be effectively prompted, to enhance a chemical strengthening effect, and obtain cover glass with ideal strengthening performance.

In a fourth possible implementation of the first aspect, the aluminosilicate glass further includes a fining agent. The fining agent is capable of pyrolysis (gasification) to generate gas or reduce viscosity of a glass liquid in a glass melting process, thereby promoting eliminating a bubble in the glass liquid.

In a fifth possible implementation of the first aspect, the fining agent is any one of tin oxide, sulfur oxide, fluoride, and cerium oxide.

In a sixth possible implementation of the first aspect, when the fining agent is the tin oxide, a mass percentage of the tin oxide is less than or equal to 0.2% in the aluminosilicate glass; when the fining agent is the sulfur oxide, a mass percentage of the sulfur oxide is less than or equal to 0.2% in the aluminosilicate glass; when the fining agent is the fluoride, a mass percentage of the fluoride is less than or equal to 0.5% in the aluminosilicate glass; or when the fining agent is the cerium oxide, a mass percentage of the cerium oxide is less than or equal to 0.5% in the aluminosilicate glass.

In a seventh possible implementation of the first aspect, the aluminosilicate glass is formed by using an overflow downdraw method or a float method. By using these methods, a relatively thin cover glass can be produced.

According to a second aspect, this application provides chemically strengthened glass, obtained by chemically strengthening the foregoing aluminosilicate glass. Because the aluminosilicate glass includes alkali metal oxide and can perform ion exchange for chemical strengthening, the obtained chemically strengthened glass has physicochemical performance of the aluminosilicate glass, and cover glass featuring a high mechanical strength, good chemical stability, low viscosity, a low density, a proper expansion coefficient, and a high Young's modulus can be obtained after the chemical strengthening. This can meet a requirement of the cover glass for a glass material.

In a first possible implementation of the second aspect, a compressive stress of the chemically strengthened glass is greater than or equal to 700 MPa. The chemically strengthened glass obtained after the chemical strengthening features a relatively large compressive stress and a relatively high mechanical strength, and can meet the requirement of the cover glass for the glass material.

In a second possible implementation of the second aspect, a thickness of a compressive stress layer of the chemically strengthened glass ranges from 40 μm to 100 μm. The chemically strengthened glass obtained after the chemical strengthening features a relatively large thickness of the compressive stress layer and a relatively high mechanical strength, and can meet the requirement of the cover glass for the glass material.

In a third possible implementation of the second aspect, a Young's modulus of the chemically strengthened glass is greater than or equal to 70 Gpa. The Young's modulus in this range can meet the requirement of the cover glass for the glass material.

In a fourth possible implementation of the second aspect, a density of the chemically strengthened glass is less than or equal to 2.52 g/cm$^3$. The chemically strengthened glass features a relatively low density and can meet the requirement of the cover glass for the glass material.

In a fifth possible implementation of the second aspect, the aluminosilicate glass is chemically strengthened through the ion exchange.

In a sixth possible implementation of the second aspect, the aluminosilicate glass is ion-exchanged with a fused (or molten) potassium salt. The compressive stress layer can be formed on a surface of the aluminosilicate glass.

In a seventh possible implementation of the second aspect, a time of the ion exchange ranges from 5 h to 7 h.

According to a third aspect, an application in which the foregoing chemically strengthened glass is used as cover glass on a display screen touch device is provided.

This application provides the aluminosilicate glass to comply with a market requirement for touchscreen cover glass. After the aluminosilicate glass is chemically strengthened, the glass substrate featuring a good mechanical strength and high chemical stability can be obtained, thereby meeting the requirement of the cover glass for the glass material.

DESCRIPTION OF EMBODIMENTS

The following describes in detail the embodiments of this application with reference to accompanying drawings.

According to a first aspect, this application provides aluminosilicate glass, where the aluminosilicate glass does not include a B element and a P element, and includes at least silicon oxide, aluminium oxide, alkali metal oxide, and gallium oxide, and the alkali metal oxide is at least one of lithium oxide and sodium oxide.

The aluminosilicate glass is glass whose main components are silicon dioxide and aluminium oxide, and the aluminium oxide content may reach at least 20%. In the aluminosilicate glass, the silicon oxide and the aluminium oxide jointly form a main body of an aluminosilicate glass network structure, so that a glass substrate can be more stable and is not easily corroded by the outside, and hardness and a mechanical strength of the glass are ensured.

The alkali metal oxide helps reduce a glass melting temperature, viscosity, and energy required for glass melting. Reducing the viscosity helps eliminate a bubble and shorten a glass melting and fining time. Further, to produce cover glass that meets a requirement, ion exchange may be performed on the aluminosilicate glass that includes the alkali metal oxide, so that the alkali metal oxide on a glass surface layer can be exchanged with an alkali metal ion (for example, a potassium ion) with a relatively large atomic radius at a high temperature, and a compressive stress layer is formed on a surface of the aluminosilicate glass, to implement chemical strengthening, and further meet a performance requirement of the cover glass.

Herein, that the alkali metal oxide is at least one of lithium oxide and sodium oxide means that the alkali metal oxide may include only the lithium oxide or the sodium oxide, or may include both the lithium oxide and the sodium oxide.

That the aluminosilicate glass does not include a B element and a P element does not mean that mass percentages of the B element and the P element are 0 in a strict sense, but means that the B element and the P element are not included except for an unavoidable impurity. Therefore, any aluminosilicate glass in which the mass percentages of the B element and the P element are within an allowable impurity range falls within the protection scope of this application.

In addition, and as a non-limiting example, the B element and the P element mentioned in this application can be mainly oxide B$_2$O$_3$ and P$_2$O$_5$.

With the added gallium oxide, the aluminosilicate glass does not include the boron element and the phosphorus element. This not only improves chemical stability of the aluminosilicate glass, but also increases a mechanical strength and a glass transition temperature of the aluminosilicate glass.

Figure 1:
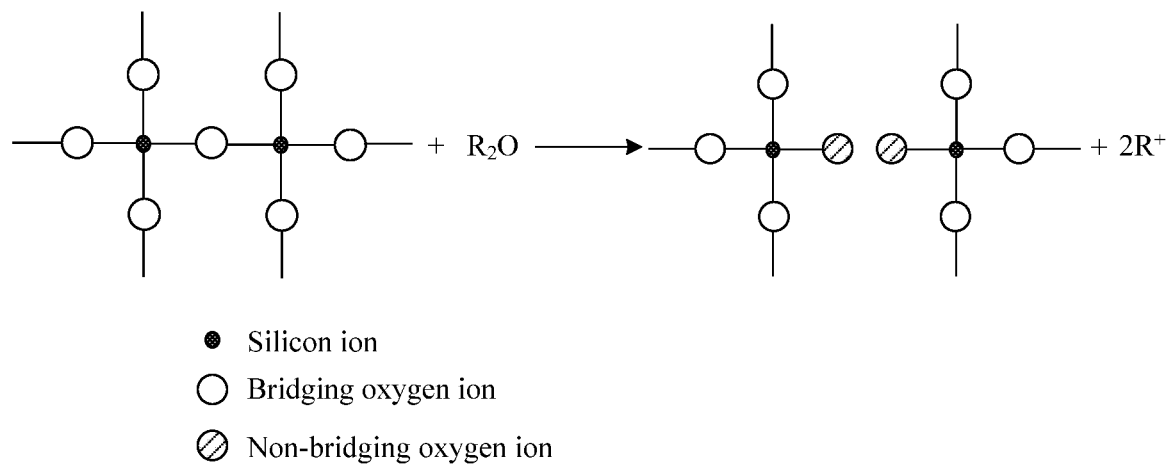
FIG. 1 is a schematic diagram of adding alkali metal oxide to quartz glass to depolymerize a [SiO$_4$]-based three-dimensional space network according to this application.
Figure 2:
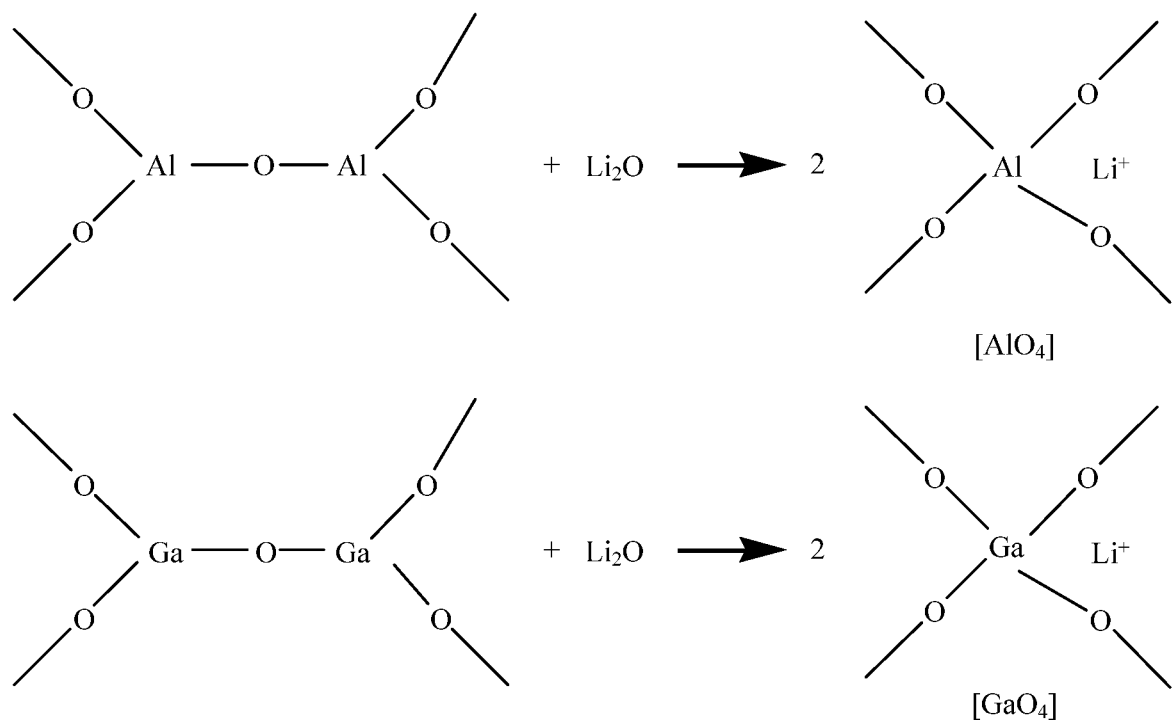
FIG. 2 is a schematic diagram of forming a glass network structure by using gallium oxide according to this application.

Specifically, referring to FIG. 1, when alkali metal oxide (represented by $R_2O$) is added to quartz glass, an original $[SiO_4]$-based three-dimensional space network is depolymerized, and non-bridging oxygen bonded to a silicon atom appears. An alkali metal ion ($R^+$) is in an ink cell near to the non-bridging oxygen, and neutralizes an excess charge. Addition of the alkali metal oxide $R_2O$ causes an increase in a ratio of oxygen to silicon. Bridging oxygen is an oxygen ion that functions as an apex angle shared by two networked polyhedrons in a glass network, that is, an oxygen ion that serves as a "bridge". Conversely, an oxygen ion that is bonded to only one networked ion and that is not shared by two networked polyhedrons is the non-bridging oxygen. When a quantity of intermediate ions (for example, $Al^{3+}$ or $Ga^{3+}$) is less than that of modification ions (for example, $Li^+$), referring to FIG. 2, a role of an intermediate ion in the glass is a glass forming body ion, that is, four-coordinated $[AlO_4]$ or $[GaO_4]$ is formed. Therefore, a Li ion with a non-bridging oxygen bond originally used for charge balance is used for charge balance of $[AlO_4]$ or $[GaO_4]$. The non-bridging oxygen bond in the glass is converted into a bridging oxygen bond. The aluminosilicate glass network structure is enhanced, and a property, such as the mechanical strength and the glass transition temperature, of the glass is improved. In addition, due to addition of the four-coordinated $[GaO_4]$, expansion space of the network structure is larger. This helps the alkali metal oxide in the network perform the ion exchange, and can shorten a time of the ion exchange and increase a compressive stress and a thickness of the compressive stress layer, so that the glass obtained after the chemical strengthening features a high mechanical strength and a low density and can meet a requirement of the cover glass for a glass material.

In conclusion, this application provides the aluminosilicate glass. After the aluminosilicate glass is chemically strengthened, a glass substrate featuring a good mechanical strength and high chemical stability can be obtained, thereby meeting the requirement of the cover glass for the glass material.

In a possible implementation of the first aspect, a mass percentage of the gallium oxide is greater than 0 and less than or equal to 5%. It can be learned from a large quantity of experiments that, by controlling the mass percentage of the gallium oxide to be within the foregoing range, cover glass featuring excellent chemical resistance, a low density, a proper expansion coefficient, and a high Young's modulus can be obtained.

In another possible implementation of the first aspect, a mass percentage of the silicon oxide ranges from 45% to 75%, and a mass percentage of the aluminium oxide ranges from 13% to 25%. The silicon oxide is beneficial to mechanical performance and chemical stability of the glass. The aluminium oxide helps increase a strain point and a bending strength of the glass. Mass percentages of the silicon oxide and the aluminium oxide are controlled to be within the foregoing range, helping improve stability, weather resistance, meltability, and formability of the glass.

In still another possible implementation of the first aspect, a mass percentage of the alkali metal ranges from 3% to 25%. Controlling the mass percentage of the alkali metal oxide to be within the foregoing range can effectively reduce the glass melting temperature, the viscosity, and the energy required for glass melting. Reducing the viscosity helps eliminate the bubble and shorten the glass melting and fining time. In addition, ion exchange between an alkali metal ion in the alkali metal oxide and the alkali metal ion with the relatively large atomic radius can be effectively prompted, to enhance a chemical strengthening effect, and obtain cover glass with ideal strengthening performance.

Further, when the alkali metal oxide includes the lithium oxide and the sodium oxide, a mass ratio of the lithium oxide to the sodium oxide ranges from 1:4 to 4:1. Herein, when the aluminosilicate glass is chemically strengthened, the alkali metal ion in the alkali metal oxide is exchanged with a relatively large alkaline ion (for example, $K^+$) in an ion exchange medium (for example, a fused salt bath). Three types of ion exchange may be performed: $Na^+$ is exchanged with $Li^+$, $K^+$ is exchanged with $Li^+$, and/or $K^+$ is exchanged with $Na^+$. Exchanging $Na^+$ with $Li^+$ leads to a relatively large surface compressive stress layer thickness but a low compressive stress. Exchanging $K^+$ with $Li^+$ leads to a small compressive stress layer thickness but a relatively large compressive stress. Exchanging $K^+$ with $Na^+$ leads to a medium layer thickness and a medium compressive stress. The compressive stress is directly proportional to a quantity of alkaline ions exchanged in the glass. Therefore, mass percentages of the lithium oxide and the sodium oxide can directly determine the chemical strengthening effect. It is proved by a large quantity of experiments that the cover glass with the ideal strengthening performance can be obtained by controlling the mass ratio of the lithium oxide to the sodium oxide to be within the foregoing range.

For example, the mass percentage of the alkali metal oxide ranges from 3% to 25%, and the mass ratio of the lithium oxide to the sodium oxide ranges from 1:4 to 4:1. Therefore, when the mass percentage of the alkali metal oxide is 3%, the mass percentage of the lithium oxide may be 0.6% in the glass, and in this case, the mass percentage of the sodium oxide may be 2.4% in the glass; the mass percentage of the lithium oxide may be 2.4% in the glass, and in this case, the mass percentage of the sodium oxide may be 0.6% in the glass; or the mass percentage of the lithium oxide may be 2% in the glass, and in this case, the mass percentage of the sodium oxide may be 1% in the glass.

Optionally, the aluminosilicate glass further includes a fining agent. The fining agent is capable of pyrolysis (gasification) to generate gas or reduce viscosity of a glass liquid in a glass melting process, thereby promoting eliminating a bubble in the glass liquid.

In an example of this application, the fining agent is any one of tin oxide, sulfur oxide, fluoride, and cerium oxide.

The electrovalence-changeable oxide, namely, the tin oxide, the sulfur oxide, and the cerium oxide, is decomposed into oxygen at the high temperature, and solubility of the oxygen decreases with an increase in a temperature, to produce a fining effect. The fluoride is vaporized during melting, to produce a fining effect. The fluoride may be ammonium fluoride or potassium fluoride. These fining agents are less toxic than arsenic oxide and antimony oxide, and produce a better fining effect.

Herein, composition of the fining agent varies, and a mass percentage of the fining agent in the aluminosilicate glass also varies.

Specifically, when the fining agent is the tin oxide, a mass percentage of the tin oxide is less than or equal to 0.2% in the aluminosilicate glass; when the fining agent is the sulfur oxide, a mass percentage of the sulfur oxide is less than or equal to 0.2% in the aluminosilicate glass; when the fining agent is the fluoride, a mass percentage of the fluoride is less than or equal to 0.5% in the aluminosilicate glass; or when the fining agent is the cerium oxide, a mass percentage of the cerium oxide is less than or equal to 0.5% in the aluminosilicate glass. It is proved by a large quantity of experiments that, when mass percentages of these fining agents fall within the ranges, these fining agents can produce a better fining effect, to obtain glass with better performance such as transparency and the mechanical strength.

Further, the fining agent can be cerium oxide. The cerium oxide is further a chemical decolorizing agent for the glass. The cerium oxide has higher oxidation potential, and therefore is better than a conventional fining agent. In addition, an amount of sodium nitrate may be further reduced in a glass formulation, to reduce a microbubble and increase the transparency, a glass strength, and water resistance. Therefore, the cerium oxide that functions as the fining agent can not only produce a fining and bubble elimination effect but can also greatly improve glass quality, make a significant contribution to an environment, and have a relatively high economic benefit and social benefit. Further, the cerium oxide is added to the glass as an anti-ultraviolet agent or an ultraviolet ray shielding agent, to prevent aging and sunshine.

Optionally, the aluminosilicate glass is formed by using an overflow downdraw method or a float method. By using these methods, a relatively thin cover glass can be produced. Glass obtained by using the overflow downdraw method features better surface quality and relatively low costs, and it is suitable for small-scale production. Forming by using the float method is suitable for production of large-sized glass, and there is a need to add a grinding and polishing device to improve surface quality of the glass, and therefore costs are relatively high.

According to a second aspect, this application provides chemically strengthened glass, obtained by chemically strengthening the foregoing aluminosilicate glass.

This application provides the chemically strengthened glass. Because the aluminosilicate glass includes alkali metal oxide and can perform ion exchange for chemical strengthening, the obtained chemically strengthened glass has physicochemical performance of the aluminosilicate glass, and cover glass featuring a high mechanical strength, good chemical stability, low viscosity, a low density, a proper expansion coefficient, and a high Young's modulus can be obtained after the chemical strengthening. This can meet a requirement of the cover glass for a glass material.

In a possible implementation of the second aspect, the aluminosilicate glass is chemically strengthened through the ion exchange. The chemically strengthened glass is mainly a glass whose thickness is less than 3 mm, and a lithium ion and a sodium ion on a glass structure surface are ion-exchanged with a high-purity fused potassium salt, to form a strengthening layer.

Specifically, the aluminosilicate glass is ion-exchanged with the fused potassium salt.

The potassium salt can be used to chemically strengthen the aluminosilicate glass, to form a compressive stress layer on a surface of the aluminosilicate glass. A specific operation of the ion exchange is not limited. For example, the aluminosilicate glass may be immersed in the fused potassium salt by using an immersion method, or the fused potassium salt may be applied to the surface of the aluminosilicate glass.

The fused potassium salt may include a sodium salt whose mass percentage is less than or equal to 3%, and the potassium salt may be potassium nitrate, potassium chloride, or the like. A temperature of the fused potassium salt ranges from 370° C. to 460° C.

Due to addition of gallium oxide, expansion space of a network structure is larger. This helps the alkali metal oxide in the network perform the ion exchange, and can shorten a time of the ion exchange. In an example of this application, a time of the ion exchange ranges from 5 h to 7 h.

In a possible example of this application, a compressive stress of the chemically strengthened glass is greater than or equal to 700 MPa. The compressive stress is a stress that resists a compression trend of an object. The compressive stress of the chemically strengthened glass may be measured by using a surface compressive stress meter. The chemically strengthened glass obtained after the chemical strengthening features a relatively large compressive stress and a relatively high mechanical strength, and can meet the requirement of the cover glass for the glass material.

In another possible example of this application, a thickness of a compressive stress layer of the chemically strengthened glass ranges from 40 μm to 100 μm. The compressive stress of the chemically strengthened glass may be measured by using a surface compressive stress meter. The chemically strengthened glass obtained after the chemical strengthening features a relatively large thickness of the compressive stress layer and a relatively high mechanical strength, and can meet the requirement of the cover glass for the glass material.

In another possible example of this application, a Young's modulus of the chemically strengthened glass is greater than or equal to 70 Gpa. When an elastic material is subjected to a positive stress, positive strain is generated. When a deformation amount does not exceed a specific elastic limit of the corresponding material, a ratio of the positive stress to the positive strain is defined as a Young's modulus of the material. The Young's modulus is a physical quantity used to describe a capability of a solid material to resist deformation. The Young's modulus of the chemically strengthened glass in this range can meet the requirement of the cover glass for the glass material.

In still another possible example of this application, a density of the chemically strengthened glass is less than or equal to 2.52 $g/cm^3$. The chemically strengthened glass features a relatively low density and can meet the requirement of the cover glass for the glass material.

According to a third aspect, an application in which the foregoing chemically strengthened glass is used as cover glass on a display screen touch device is provided.

Display screens may be various common display screens in an electronic product field, for example, a liquid crystal display television, a tablet computer, and a touchscreen mobile phone. Specifically, the chemically strengthened glass may be used to produce cover glass for display screen protection, and may also be used as a glass battery cover and the like.

The following describes a technical effect of this application by using embodiments.

A mass percentage of a glass component in each embodiment is shown in Table 1 below.

TABLE 1

| Glass component | | Embodiment 1 | Embodiment 2 | Embodiment 3 | Embodiment 4 | Embodiment 5 | Embodiment 6 | Embodiment 7 | Embodiment 8 |
|---|---|---|---|---|---|---|---|---|---|
| Silicon oxide | | 75% | 70% | 68% | 65% | 57% | 60% | 58% | 45% |
| Sodium oxide | | 2% | 0 | 12% | 0 | 8% | 14% | 16% | 25% |
| Lithium oxide | | 8% | 3% | 0 | 14% | 16% | 7% | 4% | 0 |
| Aluminium oxide | | 13% | 22% | 15.4% | 20% | 15.4% | 13.5% | 21% | 25% |
| Gallium oxide | | 1.5% | 4.5% | 4.4% | 0.8% | 3.1% | 5% | 0.7% | 4.5% |
| Fining agent | Tin oxide | 0 | 0 | 0.2% | 0 | 0 | | 0 | 0 |
| | Sulfur oxide | 0 | 0 | 0 | 0.2% | 0 | | 0 | 0 |
| | Potassium fluoride | 0 | 0 | 0 | 0 | 0 | 0.5% | 0 | 0 |
| | Ammonium fluoride | 0.5% | 0 | 0 | 0 | 0 | | 0 | 0 |
| | Cerium oxide | 0 | 0.5% | 0 | 0 | 0.5% | | 0.3% | 0.5% |

Embodiment 1

Amounts of silicon oxide, aluminium oxide, sodium oxide, lithium oxide, gallium oxide and fining agents are separately calculated based on mass percentages in Embodiment 1 shown in Table 1. These materials are weighed and mixed thoroughly, and then are added to a furnace. A float method is used for production. Melting and fining are performed at a temperature of 1600° C. for three hours. A fused glass liquid is poured on a stainless steel mould preheated at 300° C., to form a specified plate-shaped glass product. Then, the glass is annealed at 630° C. for ten hours in an annealing furnace, is subsequently cooled to 350° C. at a cooling rate of 1° C./min, and then is cooled to a room temperature with the furnace.

The obtained glass is ground and polished, is processed into a glass sample of a size of 50 mm×50 mm, and is ion-exchanged for five hours in a fused potassium nitrate salt whose temperature is 410° C., to perform chemical strengthening, so that sodium and lithium ions on a glass surface are exchanged with potassium ions in the foregoing processing liquid to obtain chemically strengthened glass A.

Embodiment 2

Amounts of silicon oxide, aluminium oxide, sodium oxide, lithium oxide, gallium oxide and fining agents are calculated based on mass percentages corresponding to Embodiment 2 shown in Table 1. These materials are weighed and mixed thoroughly, and then are added to a furnace for fusion. An overflow method is used for production. Melting and fining are performed at a temperature of 1600° C. for three hours. A fused glass liquid is poured on a stainless steel mould preheated at 300° C., to form a specified plate-shaped glass product. Then, the glass is annealed at 630° C. for ten hours in an annealing furnace, is subsequently cooled to 350° C. at a cooling rate of 1° C./min, and then is cooled to a room temperature with the furnace.

The obtained glass is ground and polished, is processed into a glass sample of a size of 50 mm×50 mm, and is ion-exchanged for seven hours in a fused potassium nitrate salt whose temperature is 460° C., to perform chemical strengthening, so that sodium and lithium ions on a glass surface are exchanged with potassium ions in the foregoing processing liquid to obtain chemically strengthened glass B.

Embodiment 3

Amounts of silicon oxide, aluminium oxide, sodium oxide, lithium oxide, gallium oxide and fining agents are calculated based on mass percentages corresponding to Embodiment 3 shown in Table 1. Aluminosilicate glass is produced according to the float method corresponding to Embodiment 1. The glass obtained after processing is ground and polished, is processed into a glass sample of a size of 50 mm×50 mm, and is ion-exchanged for five hours in a mixed bath salt whose temperature is 370° C. and that includes potassium nitrate and sodium nitrate whose mass percentage is 3%, to perform chemical strengthening, so that sodium and lithium ions on a glass surface are exchanged with potassium ions in the foregoing processing liquid to obtain chemically strengthened glass C.

Embodiment 4

Amounts of silicon oxide, aluminium oxide, sodium oxide, lithium oxide, gallium oxide and fining agents are calculated based on mass percentages corresponding to Embodiment 4 shown in Table 1. Aluminosilicate glass is produced according to the overflow downdraw method corresponding to Embodiment 2. The glass obtained after processing is ground and polished, is processed into a glass sample of a size of 50 mm×50 mm, and is ion-exchanged for seven hours in a mixed bath salt whose temperature is 410° C. and that includes potassium nitrate and sodium nitrate whose mass percentage is 3%, to perform chemical strengthening, so that sodium and lithium ions on a glass surface are exchanged with potassium ions in the foregoing processing liquid to obtain chemically strengthened glass D.

Embodiment 5

Amounts of silicon oxide, aluminium oxide, sodium oxide, lithium oxide, gallium oxide and fining agents are calculated based on mass percentages corresponding to Embodiment 5 shown in Table 1. Aluminosilicate glass is produced according to the float method corresponding to Embodiment 1. The glass obtained after processing is ground and polished, is processed into a glass sample of a size of 50 mm×50 mm, and is ion-exchanged for six hours in potassium nitrate whose temperature is 410° C., to perform chemical strengthening, so that sodium and lithium ions on a glass surface are exchanged with potassium ions in the foregoing processing liquid to obtain chemically strengthened glass E.

Embodiment 6

Amounts of silicon oxide, aluminium oxide, sodium oxide, lithium oxide, gallium oxide and fining agents are calculated based on mass percentages corresponding to Embodiment 6 shown in Table 1. Aluminosilicate glass is produced according to the overflow downdraw method corresponding to Embodiment 2. The glass obtained after processing is ground and polished, is processed into a glass sample of a size of 50 mm×50 mm, and is ion-exchanged for six hours in a mixed bath salt whose temperature is 370° C. and that includes potassium nitrate and sodium nitrate whose mass percentage is 3%, to perform chemical strengthening, so that sodium and lithium ions on a glass surface are exchanged with potassium ions in the foregoing processing liquid to obtain chemically strengthened glass F.

Embodiment 7

Amounts of silicon oxide, aluminium oxide, sodium oxide, lithium oxide, gallium oxide and fining agents are calculated based on mass percentages corresponding to Embodiment 7 shown in Table 1. Aluminosilicate glass is produced according to the float method corresponding to Embodiment 1. The glass obtained after processing is ground and polished, is processed into a glass sample of a size of 50 mm×50 mm, and is ion-exchanged for seven hours in a mixed bath salt whose temperature is 370° C. and that includes potassium nitrate and sodium nitrate whose mass percentage is 2%, to perform chemical strengthening, so that sodium and lithium ions on a glass surface are exchanged with potassium ions in the foregoing processing liquid to obtain chemically strengthened glass G.

Embodiment 8

Amounts of silicon oxide, aluminium oxide, sodium oxide, lithium oxide, gallium oxide and fining agents are calculated based on mass percentages corresponding to Embodiment 8 shown in Table 1. Aluminosilicate glass is produced according to the overflow downdraw method corresponding to Embodiment 2. The glass obtained after processing is ground and polished, is processed into a glass sample of a size of 50 mm×50 mm, and is ion-exchanged for five hours in a mixed bath salt whose temperature is 460° C. and that includes potassium nitrate and sodium nitrate whose mass percentage is 2%, to perform chemical strengthening, so that sodium and lithium ions on a glass surface are exchanged with potassium ions in the foregoing processing liquid to obtain chemically strengthened glass H.

Experimental Example

Performance tests are separately performed on chemically strengthened glass A to H obtained in Embodiment 1 to Embodiment 8.

A glass density P is measured by using an Archimedes method. A thermal expansion coefficient is measured by using a dilatometer. W indicates an average expansion coefficient. A Young's modulus is measured by using a Young's modulus tester. A surface compressive stress and a thickness of a compressive stress layer of the chemically strengthened glass are measured by using a surface stress meter FSM-6000LE.

Measurement results are shown in Table 2.

TABLE 2

| | Chemically strengthened glass | | | | | | | |
|---|---|---|---|---|---|---|---|---|
| | A | B | C | D | E | F | G | H |
| Density (g/cm$^3$) | 2.52 | 2.50 | 2.51 | 2.48 | 2.50 | 2.50 | 2.50 | 2.51 |
| Thermal expansion coefficient (0° C. to 300° C.) | 77 × 10$^{-7}$/° C. | 81 × 10$^{-7}$/° C. | 78 × 10$^{-7}$/° C. | 83 × 10$^{-7}$/° C. | 76 × 10$^{-7}$/° C. | 76 × 10$^{-7}$/° C. | 75 × 10$^{-7}$/° C. | 86 × 10$^{-7}$/° C. |
| Surface compressive stress (MPa) | 700 | 750 | 800 | 780 | 760 | 790 | 810 | 720 |
| Compressive stress layer thickness (μm) | 40 | 60 | 80 | 70 | 50 | 100 | 80 | 75 |
| Young's modulus (GPa) | 70 | 80 | 75 | 73 | 77 | 80 | 79 | 80 |

It can be learned from Table 2 that, compared with existing chemically strengthened glass, chemically strengthened glass that is obtained after aluminosilicate glass produced by using a glass component provided in this application is chemically strengthened features a lower density, a proper thermal expansion coefficient, a higher surface compressive stress, and a larger compressive stress thickness. Usually, a density of chemically strengthened glass in the prior art may reach 2.50 g/cm$^3$, a thermal expansion coefficient is 75×10$^{-7}$/° C., a surface compressive stress is 650 MPa, and a compressive stress layer thickness is 35 μm. Therefore, the chemically strengthened glass in this application can meet a requirement of cover glass for a glass material.

In conclusion, this application provides the aluminosilicate glass. After the aluminosilicate glass is chemically strengthened, a glass substrate featuring a good mechanical strength and high chemical stability can be obtained, thereby meeting the requirement of the cover glass for the glass material.

In conclusion, the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A chemically strengthened glass plate, obtained by chemically strengthening an aluminosilicate glass plate, wherein a composition of the aluminosilicate glass comprises:
   silicon oxide, aluminium oxide, alkali metal oxide and gallium oxide, wherein
   the aluminosilicate glass does not comprise either of a boron element and a phosphorus element,
   the alkali metal oxide comprises lithium oxide, and
   the gallium oxide is formed as a four-coordinated [GaO$_4$] in the aluminosilicate glass.

2. The chemically strengthened glass plate according to claim 1, wherein the chemically strengthened glass meets at least one of the following criteria:
   a compressive stress of the chemically strengthened glass is greater than or equal to 700 MPa;
   a thickness of a compressive stress layer of the chemically strengthened glass ranges from 40 μm to 100 μm;
   a Young's modulus of the chemically strengthened glass is greater than 70 Gpa; and
   a density of the chemically strengthened glass is less than or equal to 2.52 g/cm$^3$.

3. The chemically strengthened glass plate according to claim 1, wherein the aluminosilicate glass plate is chemically strengthened through ion exchange.

4. The chemically strengthened glass plate according to claim 3, wherein the aluminosilicate glass plate is chemically strengthened through the ion-exchange with a fused potassium salt.

5. The chemically strengthened glass plate according to claim 4, wherein a time of the ion exchange ranges from 5 hours to 7 hours.

6. The chemically strengthened glass plate according to claim 1, wherein the chemically strengthened glass is used as a cover glass plate on a display screen.

7. The chemically strengthened glass plate according to claim 1, wherein the aluminosilicate glass meets at least one of the following criteria (1)-(3):
   (1) a mass percentage of the gallium oxide is greater than 0 and less than or equal to 5%;
   (2) a mass percentage of the silicon oxide ranges from 45% to 75%, and a mass percentage of the aluminium oxide ranges from 13% to 25%; and
   (3) a mass percentage of the alkali metal oxide ranges from 3% to 25%.

8. The chemically strengthened glass plate according to claim 1, wherein the aluminosilicate glass further comprises a fining agent.

9. The chemically strengthened glass plate according to claim 8, wherein the fining agent is any one of tin oxide, sulfur oxide, fluoride, and cerium oxide.

10. The chemically strengthened glass plate according to claim 9, wherein
    when the fining agent is the tin oxide, a mass percentage of the tin oxide is less than or equal to 0.2% in the aluminosilicate glass;
    when the fining agent is the sulfur oxide, a mass percentage of the sulfur oxide is less than or equal to 0.2% in the aluminosilicate glass;
    when the fining agent is the fluoride, a mass percentage of the fluoride is less than or equal to 0.5% in the aluminosilicate glass; and
    when the fining agent is the cerium oxide, a mass percentage of the cerium oxide is less than or equal to 0.5% in the aluminosilicate glass.

11. A display screen of an electronic device, comprising: the chemically strengthened glass plate according to claim 1.

12. The display screen according to claim 11, wherein the aluminosilicate glass plate meets at least one of the following criteria (1)-(3):
    (1) a mass percentage of the gallium oxide is greater than 0 and less than or equal to 5%;
    (2) a mass percentage of the silicon oxide ranges from 45% to 75%, and a mass percentage of the aluminium oxide ranges from 13% to 25%; and
    (3) a mass percentage of the alkali metal oxide ranges from 3% to 25%.

13. A chemically strengthened glass plate, obtained by chemically strengthening an aluminosilicate glass plate, wherein a composition of the aluminosilicate glass comprises silicon oxide, aluminium oxide, alkali metal oxide, and gallium oxide, wherein:
    (1) a mass percentage of the gallium oxide is greater than 0 and less than or equal to 5%;
    (2) a mass percentage of the silicon oxide ranges from 45% to 75%;
    (3) a mass percentage of the aluminium oxide ranges from 13% to 25%; and
    (4) a mass percentage of the alkali metal oxide ranges from 3% to 25%;
    wherein:
    the aluminosilicate glass does not comprise either of a boron element and a phosphorus element,
    the alkali metal oxide comprises lithium oxide, sodium oxide, or a combination thereof,
    the gallium oxide is formed as a four-coordinated [GaO$_4$] in the aluminosilicate glass, and
    wherein the chemically strengthened glass meets all of the following criteria:
    (a) a compressive stress of the chemically strengthened glass is greater than or equal to 700 MPa;
    (b) a thickness of a compressive stress layer of the chemically strengthened glass ranges from 40 μm to 100 μm;
    (c) a Young's modulus of the chemically strengthened glass is greater than 70 Gpa; and
    (d) a density of the chemically strengthened glass is less than or equal to 2.52 g/cm$^3$.

14. The chemically strengthened glass plate according to claim 13, wherein the alkali metal oxide comprises lithium oxide.

15. The chemically strengthened glass plate according to claim 13, wherein the alkali metal oxide comprises lithium oxide and sodium oxide, wherein the mass ratio of lithium oxide to sodium oxide ranges from 1:4 to 4:1.

16. The chemically strengthened glass plate according to claim 1, wherein the alkali metal oxide comprises lithium oxide and sodium oxide, wherein the mass ratio of lithium oxide to sodium oxide ranges from 1:4 to 4:1.

17. The chemically strengthened glass plate according to claim 13, wherein the aluminosilicate glass further comprises a fining agent.

18. The chemically strengthened glass plate according to claim 17, wherein the fining agent is any one of tin oxide, sulfur oxide, fluoride, and cerium oxide.

19. The chemically strengthened glass plate according to claim 18, wherein
- when the fining agent is the tin oxide, a mass percentage of the tin oxide is less than or equal to 0.2% in the aluminosilicate glass;
- when the fining agent is the sulfur oxide, a mass percentage of the sulfur oxide is less than or equal to 0.2% in the aluminosilicate glass;
- when the fining agent is the fluoride, a mass percentage of the fluoride is less than or equal to 0.5% in the aluminosilicate glass; and
- when the fining agent is the cerium oxide, a mass percentage of the cerium oxide is less than or equal to 0.5% in the aluminosilicate glass.

* * * * *